United States Patent [19]

Kosmowski

[11] Patent Number: 4,480,364

[45] Date of Patent: Nov. 6, 1984

[54] WORKPIECE HOLDING AND ALIGNMENT DEVICE

[75] Inventor: Wojciech B. Kosmowski, San Juan Capistrano, Calif.

[73] Assignee: BMC Industries, Inc., St. Paul, Minn.

[21] Appl. No.: 519,823

[22] Filed: Aug. 3, 1983

Related U.S. Application Data

[60] Division of Ser. No. 494,687, May 17, 1983, Pat. No. 4,421,305, which is a continuation of Ser. No. 236,847, Feb. 23, 1981, abandoned.

[51] Int. Cl.³ ............................................. B23Q 3/00
[52] U.S. Cl. ...................................... 29/56.6; 408/69; 408/87; 409/220; 409/225
[58] Field of Search ...................... 409/225, 219, 220; 29/56.6, 760, 464; 408/1, 69, 72 R, 87; 269/289 R, 305, 309, 310, 311, 312, 314, 287, 903, 20; 46/26

[56] References Cited

U.S. PATENT DOCUMENTS

| | | |
|---|---|---|
| 993,426 | 5/1911 | Whitehead ........................ 409/219 |
| 2,421,957 | 6/1947 | Mead ............................... 29/56.6 X |
| 3,135,138 | 6/1964 | Zdanis ............................. 409/220 X |
| 4,073,215 | 2/1978 | Coope et al. .................... 409/219 |
| 4,184,669 | 1/1980 | Bald ................................. 269/309 |
| 4,286,778 | 9/1981 | Follmeyer ....................... 409/225 X |
| 4,421,305 | 12/1983 | Kosmowski ...................... 269/287 |

Primary Examiner—William R. Briggs
Attorney, Agent, or Firm—Spensley, Horn, Jubas & Lubitz

[57] ABSTRACT

An adjustable holding and alignment device is provided for a workpiece having alignment pins. The device has a plurality of bars separated by spacers which define an alignment hole and an alignment slot through which the workpiece alignment pins may be inserted. The spacers can be removed and different sized spacers can be substituted to accommodate other alignment pin sizes.

3 Claims, 3 Drawing Figures

WORKPIECE HOLDING AND ALIGNMENT DEVICE

This is a division of application Ser. No. 494,687, filed on May 17, 1983, now U.S. Pat. No. 4,421,305, which is a continuation of application Ser. No. 236,847, filed on Feb. 23, 1981, now abandoned.

BACKGROUND OF THE INVENTION

1. Field of the Invention

The present invention relates to tooling machinery and more particularly to alignment plates for holding and aligning a workpiece.

Machinery which is used to perform a variety of tooling operations on a workpiece, such as drilling and routing, is often automated. For example, a machine can be programmed with a set of instructions to perform a series of drilling operations at predetermined locations on a workpiece such as a stack of printed circuit boards. The machine typically has a movable worktable which sequentially moves the workpiece beneath a tooling element such as a drill so that the proper locations on the workpiece are drilled. It is important for the workpiece to be properly aligned on the worktable so that the machine "knows" where the workpiece is. In other words, the workpiece must be accurately positioned relative to an origin or "starting point" on the worktable and then secured to prevent the workpiece from shifting on the table. With the workpiece so aligned, the machine may be programmed to perform various tasks at particular locations on the workpiece measured with respect to the starting point. To this end, workpieces are often provided with a plurality of alignment pins which fit into alignment holes and slots in an alignment plate which is in turn fastened to the worktable.

2. Description of the Prior Art

Prior alignment plates have typically comprised a rather large and thick metal plate which is bolted to the worktable, as shown in FIG. 1. The plate often has an alignment hole bored into the plate and a cavity excavated from the top side of the plate. Two alignment bars are glued into the cavity with epoxy glue and spaced from each other to form an alignment slot between the bars. The alignment pins of a workpiece, such as a stack of printed circuit boards, are then inserted into the alignment hole and alignment slot which aligns the workpiece relative to the worktable. At the end of the tooling operation, the completed workpiece is removed from the alignment plate and a new workpiece to be tooled is inserted into the alignment plate.

One disadvantage of these prior alignment plates is that they typically can accomodate only one size alignment pin, since the diameter of the alignment hole and width of the alignment slot are fixed. These alignment plates are also relatively difficult to fabricate, since the alignment bars must be carefully glued into position relative to the alignment hole and the bolt holes through which the plate is fastened to the worktable. Also, the alignment plates often are very thick to allow the cavity to have a sufficient depth and hence tend to be very heavy. Since the worktable to which the alignment plate is fastened often moves to position the workpiece under the tooling element, the use of a heavy alignment plate can result in slower movement, which reduces efficiency and makes the operation less economical. Furthermore, machinery components located below the surface of the worktable often need to be accessed, which generally requires the removal of the alignment plate. Hence, the positions of the alignment hole and alignment slot with respect to the table are disturbed and the alignment plate must be carefully realigned when it is replaced onto the work table.

Accordingly, a practical alignment device should be lightweight and capable of accomodating a variety of alignment pin diameters. Furthermore, the alignment device should provide access to the worktable without necessitating disturbing the alignment hole and alignment slot positions.

SUMMARY OF THE INVENTION

It is an object of the present invention to provide a workpiece holding and alignment device meeting the above-mentioned criteria, and, particularly, in a manner requiring a relatively uncomplicated mechanical arrangement.

A preferred embodiment of the present invention provides a device for holding a workpiece having alignment pins in an aligned position on a worktable, comprising a first bar having means for fastening the first bar to the worktable, and a second bar. A first spacer is positioned between the first and second bars to provide a predetermined distance between the first and second bars at one end of the bars. The first spacer has an alignment hole through which a workpiece alignment pin may be inserted. A second spacer having a thickness equal to the first spacer is positioned between the first and second bars so that the bars define a parallel sided slot through which another workpiece alignment pin may be inserted. Fastener means are provided for fastening the second bar and spacers to the first bar.

An alignment device in accordance with the present invention can accomodate a variety of workpiece alignment pin diameters by substituting differently sized spacers between the alignment bars. Furthermore, the alignment device may be made significantly thinner than previous alignment plates, with a resulting weight saving which allows the worktable to move more quickly, thereby rendering the machine more efficient.

These and other objects and advantages of the invention are more particularly set forth in the following detailed description and in the accompanying drawings.

DETAILED DESCRIPTION OF THE DRAWINGS

Figure 1:
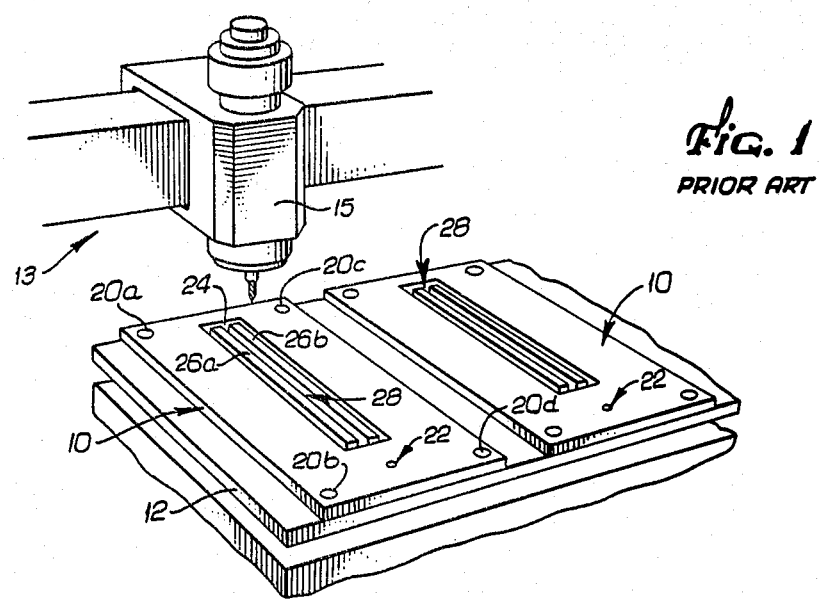
FIG. 1 is a perspective view of two typical prior art alignment devices.

FIG. 1 shows a pair of identical prior art alignment and holding plates 10 which are mounted on a worktable 12. The worktable 12 is part of an automated machine such as a printed circuit board drilling machine indicated generally at 13 which has a tooling element such as a drill 15 positioned over the worktable 12. A workpiece such as the one indicated at 14 in FIG. 2 comprises a stack of printed circuit boards 16a–c which are secured together by means of two alignment pins 18a and 18b (shown in phantam). The prior art alignment plate 10 is mounted on the worktable 12 by four bolts or screws 20a–d. The plate 10 has an alignment hole 22 bored into the plate and has an elongated and generally rectangular cavity 24 milled into the upper surface of the plate to a depth which is somewhat greater than the length of the portion of the alignment pins 18a and 18b extending below the board 16a. Within the cavity 24, two metal bars 26a and 26b are carefully glued with epoxy to the bottom of the cavity 24 to form an alignment slot 28 between the bars 26a and 26b. The tops of the bars 26a and 26b are flush with the surface of the plate 10.

With the plate 10 bolted to the worktable 12, the machine can be initialized relative to a fixed starting point on the worktable 12 or alignment plate 20. The workpiece 14 is pressed into the alignment plate 10 with the alignment pin 18a inserted into the alignment hole 22 and the alignment pin 18b inserted into the slot 28. Since the positions of the alignment hole 22 and alignment slot 28 relative to the starting point are known, the position of the workpiece is also known and can be programmed into the machine. Accordingly, the automated machine will be able to position a particular section of the workpiece underneath the tooling element by moving the worktable 12 a calculated distance from the starting point.

It is important that the alignment pins 18a and 18b fit snugly within the alignment hole 22 and alignment slot 28 so that the workpiece 14 will not move relative to the worktable 12 as the worktable 12 rapidly shifts left and right and forward and back to position the workpiece underneath the tooling element. Thus, for each alignment pin size, a different alignment plate is usually fabricated. In addition, the alignment bars 26a and 26b must be accurately positioned within the cavity 24, which is difficult to do. Also, the plate 10 must be relatively thick in order to project above the cavity 24. The thickness requirement tends to make the plate 10 heavy. As mentioned before, this can increase the response time of the machine. Also, in order to access the worktable 12 beneath the alignment plate 10, the bolts 20a-d must be removed and the alignment plate removed, thereby disturbing the alignment hole and slot positions and the alignment of the machine.

Figure 2:
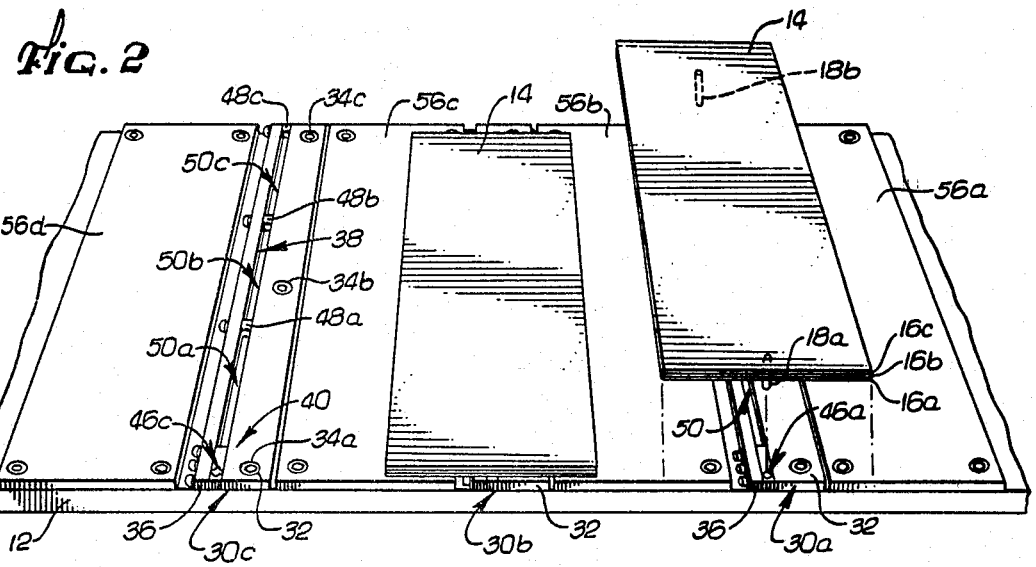
FIG. 2 is a perspective view of a plurality of alignment devices according to a preferred embodiment of the present invention mounted on a worktable.
Figure 3:
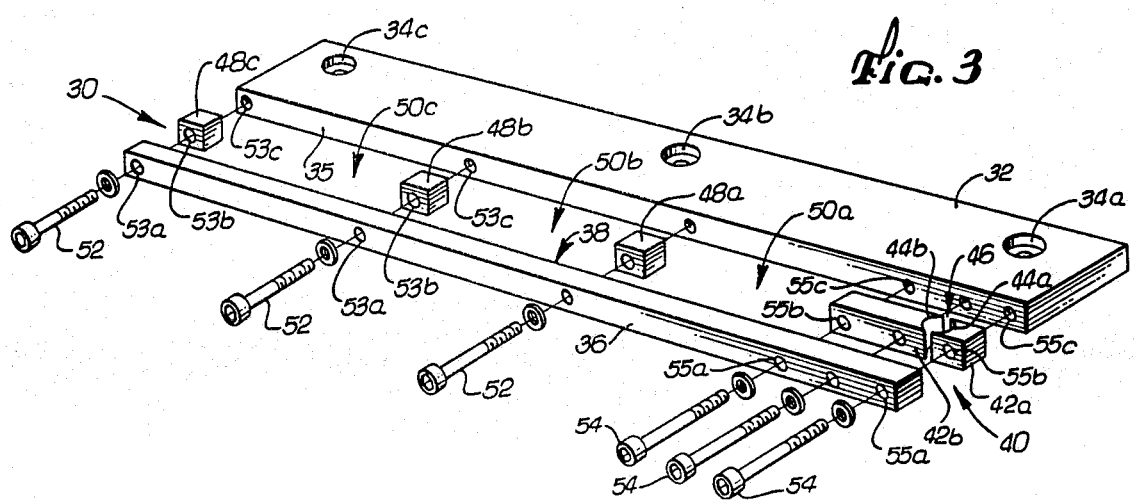
FIG. 3 is an exploded perspective view of an alignment device of FIG. 2 isolated from the worktable.

Referring now to FIGS. 2 and 3, a preferred embodiment of the present invention which overcomes the previously mentioned limitations is indicated generally at 30. The device 30 comprises a narrow rectangular plate or bar 32 which has a plurality of vertically oriented fastener holes 34a-c through which fasteners may be passed to secure the bar 32 to the worktable 12. The bar 32 has a lengthwise edge 35 which is machined to be straight, flat, and perpendicular to the upper surface of the bar 32. The device 30 also includes a retainer bar 36 which also has a straight and flat edge 38 which faces the edge 35 of the bar 32.

Positioned between edges 35 and 38 of the two bars 32 and 36 is a spacer indicated at 40 which comprises two spacer segments 42a and 42b. At one end of each of the segments 42a and 42b is a trough-shaped end portion 44a and 44b, respectively, which has a semicircular cross-section. The trough-shaped end portions 44a and 44b face each other to define a circular alignment hole 46 between the spacer segments 42a and 42b. The end portions 44a and 44b are sized such that a workpiece alignment pin fits snugly into the alignment hole 46, thereby minimizing lateral movement.

Also positioned between the walls 35 and 38 of the bars 32 and 36 are a plurality of spacers 48a-c. The spacers 48a-c have the same width as the spacer segments 42a and 42b and form a plurality of alignment slots 50a-c between the bar walls 35 and 38. The slots 50a-c are aligned in a row from the alignment hole 46 and have a width substantially equal to the diameter of the alignment hole 46 and the workpiece alignment pins so that each alignment slot will snugly accomodate an alignment pin. The spacers 48a and 48b are optional depending upon the length of the device. The omission of the spacers 48a and 48b leaves one large slot 50.

The device 30 is assembled by inserting a screw 52 through an opening 53a in the retainer bar 36, through an opening 53b in a spacer and into a hole 53c in the bar 32 for each of the spacers 48a-c. Similarly, screws 54 are inserted through openings 55a in the retainer bar 36, through openings 55b in the spacer segments 42a and 42b into holes 55c in the bar 32. Of course, other fasteners may be used to assemble the alignment device.

Three such alignment devices 30 are indicated at 30a-c, respectively, in FIG. 2 and are bolted to the worktable 12 to form three work stations. Also bolted to the worktable 12 are a plurality of filler plates 56a-d spaced between the alignment devices. A workpiece such as the workpiece indicated at 14 in FIG. 2 may be inserted into the alignment device 30a by inserting the alignment pin 18a of the workpiece 14 into the alignment hole 46a and the alignment pin 18b into one of the alignment slots 50a-c of device 30a. The provision of alignment slots in the device rather than holes allows the alignment device to accomodate workpieces of variable length (i.e., various pin spacings). Another workpiece 14 is shown secured in the alignment device 30b.

Should it become necessary to access the worktable 12, one of the filler plates 56a-d can be easily removed, without disturbing the alignment devices and the position of the alignment holes and slots. Furthermore, the alignment devices 30 and filler plates 56a-d can be manufactured much thinner and lighter than alignment plate such as that shown in FIG. 1. Since the worktables often are required to move and change direction rapidly, a thinner alignment plate allows the worktable 12 to move quicker with less energy expended.

Should it be desired to work on a workpiece having a different size alignment pin, all that need be done is remove the alignment device 30, remove the screws 52 and 54 and substitute different spacer segments 42a and 42b which form the required diameter alignment hole, together with the appropriate width alignment slot spacers 48a-c. The device 30 is then reassembled with the screws and rebolted to the worktable 12. By utilizing a modular design including standard alignment plates and variable sized spacers, the necessity of custom fabricating individual alignment devices having different sized openings is eliminated.

It will, of course, be understood that modifications of the present invention, in its various aspects, will be apparent to those skilled in the art. For example, it is recognized that the alignment slots, alignment holes and bars of the present invention may have other shapes and configurations. As such, the scope of the invention should not be limited by the particular embodiment herein described, but should be defined only by the appended claims and equivalents thereof.

What is claimed is:

1. A tooling apparatus for holding and tooling a workpiece having alignment pins in an aligned position, said apparatus comprising:
   a power tool;

a worktable positioned adjacent the power tool;
a first bar;
first fastener means for securely fastening the first bar to the worktable to prevent substantial movement of the first bar relative to the worktable;
a second bar;
a first spacer positioned between the first and second bars and having a predetermined width for spacing the first bar from the second bar by the predetermined width, said first spacer including an alignment aperture into which a workpiece alignment pin may be inserted;
a second spacer positioned between the first and second bars and having a predetermined width for spacing the first bar from the second bar by the predetermined width of the second spacer to thereby define a second aperture between the first and second bars into which another workpiece alignment pin may be inserted; and
second fastener means for securely fastening the second bar and the spacers to the first bar, wherein the workpiece is held in an aligned position on the worktable adjacent to the tool.

2. The device of claim 1 further including a plurality of spacers having a predetermined width, wherein said spacers are positioned between the first and second bars to define a plurality of slots aligned in a row, said slots having a width which will snugly accomodate a workpiece alignment pin.

3. A tooling apparatus for holding and tooling a workpiece having alignment pins in an aligned position, said apparatus comprising:
a power tool;
a worktable positioned adjacent the power tool;
a first bar;
a second bar;
first fastener means for securely fastening the first bar to the worktable to prevent substantial movement of the first bar relative to the worktable;
a plurality of spacers positioned between the first and second bars for spacing the first bar from the second bar so that the first and second bars and the spacers thereby define at least one alignment aperture between the first and second bars and the spacers, said aperture being shaped to hold an alignment pin inserted into the aperture against substantial lateral movement; and
a second fastener means for securely fastening the second bar and the spacers to the first bar.

* * * * *